United States Patent
Kumar et al.

(10) Patent No.: US 12,525,892 B2
(45) Date of Patent: Jan. 13, 2026

(54) ASSEMBLY (71) Applicant: GENERAL ELECTRIC TECHNOLOGY GMBH, Baden (CH)

(72) Inventors: Amit Kumar, Stafford (GB); Francisco Leon Chacon, Stafford (GB); Elisabetta Lavopa, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 150 days.

(21) Appl. No.: 18/563,042

(22) PCT Filed: May 16, 2022

(86) PCT No.: PCT/EP2022/063152
§ 371 (c)(1),
(2) Date: Nov. 21, 2023

(87) PCT Pub. No.: WO2022/248265
PCT Pub. Date: Dec. 1, 2022

(65) Prior Publication Data
US 2024/0243582 A1 Jul. 18, 2024

(30) Foreign Application Priority Data
May 26, 2021 (EP) .................................. 21275063

(51) Int. Cl.
*H02M 7/00* (2006.01)
*H02J 3/36* (2006.01)

(52) U.S. Cl.
CPC ............... *H02M 7/003* (2013.01); *H02J 3/36* (2013.01); *Y02E 60/60* (2013.01)

(58) Field of Classification Search
CPC ........ H02M 7/003; H02M 7/4835; H02J 3/36; Y02E 60/60
See application file for complete search history.

(56) References Cited

FOREIGN PATENT DOCUMENTS

| CN | 107919679 A | 4/2018 |
| CN | 110247560 A | 9/2019 |

(Continued)

OTHER PUBLICATIONS

Extended European Search Report issued in EP Application No. 21275063.2 dated Nov. 24, 2021, 7 pages.

(Continued)

*Primary Examiner* — Daniel Cavallari
(74) *Attorney, Agent, or Firm* — Eversheds Sutherland (US) LLP (57) ABSTRACT

There is provided an assembly for use in electrical power transmission. The assembly includes a building for housing an electrical power transmission component, a charging circuit, a grounding circuit for electrical connection to ground, and at least one transformer located outside the building. The or each transformer including mutually coupled first and second transformer windings, the or each first transformer winding for electrical connection to an AC network, the or each second transformer winding for electrical connection to the electrical power transmission component, the or each transformer further including phase and neutral bushings electrically connected to respective terminals of the corresponding second transformer winding, the or each phase bushing extending into the building for electrical connection to the electrical power transmission component, the charging circuit electrically interconnecting the or each neutral bushing and the grounding circuit.

14 Claims, 7 Drawing Sheets

(56) References Cited

FOREIGN PATENT DOCUMENTS

| | | |
|---|---|---|
| CN | 112217403 A | 1/2021 |
| EP | 3726718 A1 | 10/2020 |

OTHER PUBLICATIONS

International Search Report and Written Opinion for PCT/EP2022/063152, dated Sep. 14, 2022, 13 pages.

ASSEMBLY

TECHNICAL FIELD

The invention relates to an assembly for use in electrical power transmission, preferably for use in high voltage direct current (HVDC) power transmission.

BACKGROUND OF THE INVENTION

In HVDC power transmission networks alternating current (AC) power is typically converted to direct current (DC) power for transmission via overhead lines, under-sea cables and/or underground cables. This conversion removes the need to compensate for the reactive load effects imposed by the power transmission medium, i.e. the transmission line or cable, and reduces the cost per kilometre of the lines and/or cables, and thus becomes cost-effective when power needs to be transmitted over a long distance.

The conversion between DC power and AC power is utilised in power transmission networks where it is necessary to interconnect the DC and AC networks. In any such power transmission network, converters are required at each interface between AC and DC power to effect the required conversion from AC to DC or from DC to AC.

SUMMARY OF THE INVENTION

According to an aspect of the invention, there is provided an assembly for use in electrical power transmission, the assembly comprising:
  a building for housing an electrical power transmission component;
  a charging circuit;
  a grounding circuit for electrical connection to ground; and
  at least one transformer located outside the building, the or each transformer including mutually coupled first and second transformer windings, the or each first transformer winding for electrical connection to an AC network, the or each second transformer winding for electrical connection to the electrical power transmission component, the or each transformer further including phase and neutral bushings electrically connected to respective terminals of the corresponding second transformer winding, the or each phase bushing extending into the building for electrical connection to the electrical power transmission component, the charging circuit electrically interconnecting the or each neutral bushing and the grounding circuit.

The configuration of the or each transformer of the assembly of the invention permits optimisation of the electrical connections and physical arrangements of the various parts of the assembly in a space-saving and cost-efficient manner.

In embodiments of the invention, the or each neutral bushing, the charging circuit and the grounding circuit may be located outside the building.

The arrangement of the or each neutral bushing, the charging circuit and the grounding circuit outside the building reduces the overall cost, size and footprint of the building while ensuring that desired operation performance requirements are met. Such an arrangement provides a range of technical and commercial benefits including, but not limited to: lower building HVAC losses; lower electrical noise; easier and reduced maintenance requirements; more design freedom for the bushings; and a simple and more cost-effective design of the or each transformer.

In further embodiments of the invention, the assembly may include three single-phase transformers located outside the building, the three single-phase transformers defining a three-phase transformer arrangement, wherein the neutral bushings of the three single-phase transformers may be electrically coupled in a star arrangement so that the charging circuit is electrically connected between each neutral bushing and a neutral point of the star arrangement, the neutral point being electrically connected to the grounding circuit.

The purpose of the charging circuit is to control an inrush current arising from energisation of the electrical power transmission component. The configuration of the charging circuit may vary. For example, the charging circuit may include a bypass switching element and a resistive element, the bypass switching element switchable to selectively permit electrical bypass of the corresponding resistive element.

In such embodiments of the invention, the charging circuit may include three charging sub-circuits, each charging sub-circuit including a bypass switching element and a resistive element, each bypass switching element switchable to selectively permit electrical bypass of the corresponding resistive element, each charging sub-circuit electrically connected in series between the neutral point and a respective one of the neutral bushings. This provides each phase of the three-phase transformer arrangement with a dedicated charging sub-circuit.

In other such embodiments of the invention, the charging circuit may include two charging sub-circuits, each charging sub-circuit including a bypass switching element and a resistive element, each bypass switching element switchable to selectively permit electrical bypass of the corresponding resistive element, a first of the charging sub-circuits electrically connected in series between the neutral point and a first of the neutral bushings, a second of the charging sub-circuits electrically connected in series between the neutral point and a second of the neutral bushings, a third of the neutral bushings electrically connected directly to the neutral point. Hence, the size and footprint of the charging circuit may be further optimised by providing charging sub-circuits for only two phases of the transformer arrangement while retaining the overall ability to limit any inrush current arising from energisation of the electrical power transmission component.

Other configurations of the charging circuit and the charging sub-circuits are envisaged.

The configuration of the grounding circuit may vary as long as it is capable of electrically connecting the assembly to ground. For example, the grounding circuit may include a bypass switching element, a resistive element, an inductive element and/or a capacitive element.

The or each bypass switching element may be or may include, but is not limited to, a circuit breaker or a disconnector. The or each resistive element may be or may include, but is not limited to, a linear resistor or a surge arrester.

As a result of the configuration of the invention, it becomes possible to arrange the orientation of the or each neutral bushing in different ways that do not require the or each neutral bushing to extend into the building. For example, the or each neutral bushing may be arranged so that a longitudinal axis extending through terminals of the or each neutral bushing has a vertical or substantially vertical orientation.

The or each phase bushing may be arranged so that a longitudinal axis extending through terminals of the or each phase bushing has a horizontal or substantially horizontal orientation. Alternatively the or each phase bushing may be arranged so that a longitudinal axis extending through terminals of the or each phase bushing has a tilted orientation with respect to the horizontal.

Such exemplary arrangements of the phase and neutral bushings provide greater clearance between the bushings when compared to two horizontal bushings positioned next to each other and extending into the building. In turn, the bushings of the invention may be designed to use smaller turrets, less material and/or less oil but also permits an easier construction of the building's interface with the or each transformer to simplify maintenance and replacement of the or each transformer.

In further embodiments of the invention, the or each transformer may include a neutral busbar electrically interconnecting the corresponding neutral bushing and the charging circuit.

The type and configuration of the electrical power transmission component may vary so long as the electrical power transmission component is electrically connectable to an AC electrical network via the or each transformer. In one non-limiting example, the electrical power transmission component may be or may include a converter-based electrical device, such as at least one switching valve of a voltage sourced converter. In another non-limiting example, the electrical power transmission component may be or may include a reactor, which itself may be connected to at least one switching valve of a voltage sourced converter.

In still further embodiments of the invention, the building may be a valve hall or a reactor hall.

Other buildings for housing electrical power transmission components are envisaged.

It will be appreciated that the use of the terms "first" and "second", and the like, in this patent specification is merely intended to help distinguish between similar features, and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Preferred embodiments of the invention will now be described, by way of non-limiting examples, with reference to the accompanying drawings in which.

The figures are not necessarily to scale, and certain features and certain views of the figures may be shown exaggerated in scale or in schematic form in the interests of clarity and conciseness.

DETAILED DESCRIPTION

The following embodiments of the invention are used primarily in HVDC applications, but it will be appreciated that the following embodiments of the invention are applicable mutatis mutandis to other applications operating at different voltage levels. The following embodiments of the invention are described with reference to an AC-DC voltage sourced converter, but it will be appreciated that the following embodiments of the invention are applicable mutatis mutandis to other types of converter-based electrical devices and other electrical power transmission components.

Figure 1:
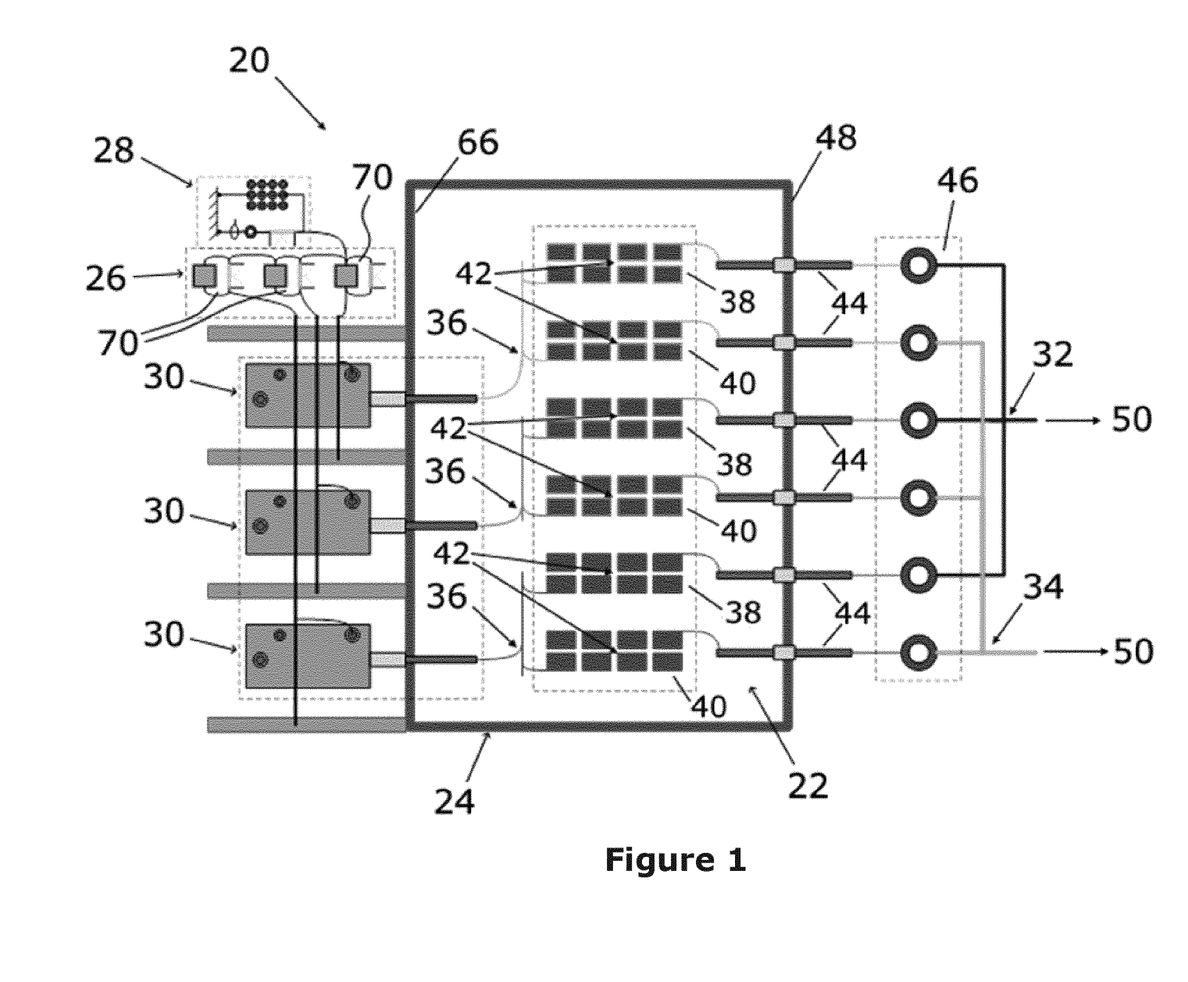
FIG. 1 shows an assembly according to a first embodiment of the invention.
Figure 2:
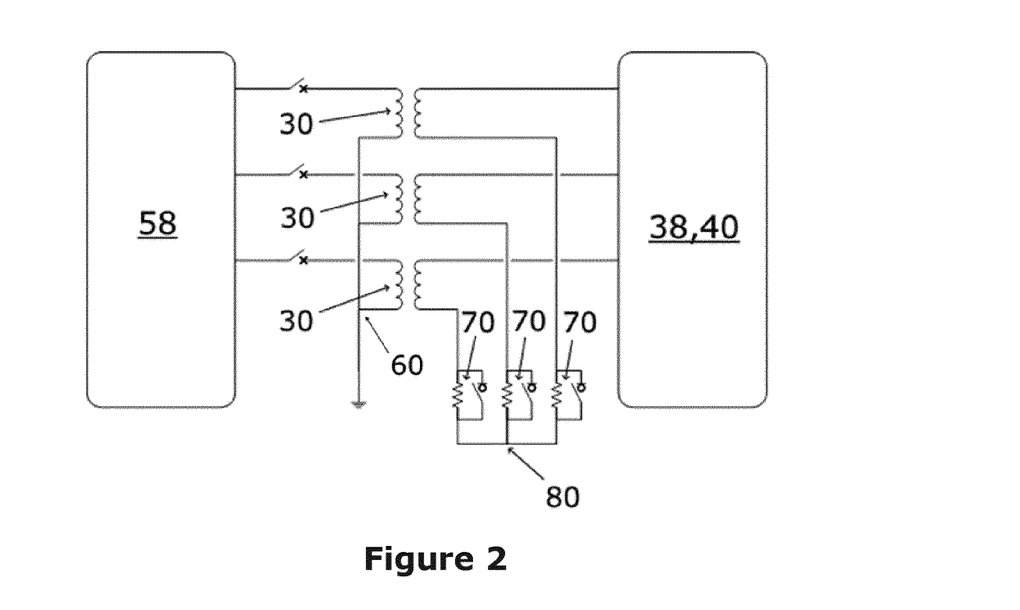
FIG. 2 shows a circuit diagram of the assembly of FIG. 1.

An assembly according to a first embodiment of the invention is shown in FIG. 1 and is designated generally by the reference numeral 20. FIG. 2 shows a circuit diagram of the assembly of FIG. 1. The assembly 20 comprises a voltage sourced converter 22, a building 24, a charging circuit 26, a grounding circuit 28 and a plurality of single-phase transformers 30.

The voltage sourced converter 22 is an AC/DC power converter having AC and DC sides. The voltage sourced converter 22 includes first and second DC terminals 32,34 that define the DC side. The voltage sourced converter 22 includes a plurality of AC terminals 36 that defines the AC side.

The voltage sourced converter 22 includes a plurality of converter limbs. Each converter limb extends between the first and second DC terminals 32,34. Each converter limb includes a first limb portion 38 that extends between the first DC terminal 32 and the AC terminal 36, and a second limb portion 40 that extends between the second DC terminal 34 and the AC terminal 36. Each limb portion 38,40 includes a switching valve that includes a plurality of series-connected switching elements 42, each of which is in the form of an IGBT. It is envisaged that, in other embodiments of the invention, the plurality of series-connected switching elements 42 in each limb portion 38,40 may be replaced by one or more other types of semiconductor switches.

It will be appreciated that the topology of the voltage sourced converter 22 is merely chosen to help illustrate the working of the invention and that the voltage sourced converter 22 may be replaced by another converter with a different topology. For example, the voltage sourced converter may be configured as a chain-link converter, such as the Modular Multilevel Converter (MMC) or the Alternate Arm Converter (AAC).

The limb portions 38,40 of the voltage sourced converter 22 are housed inside the building 24, which is in the form of a valve hall. The assembly 20 includes a plurality of DC bushings 44 and a plurality of reactors 46. Each limb portion 38,40 is electrically connected to the corresponding DC terminal 32,34 via one of the DC bushings 44 and one of the reactors 46. Each DC bushing 44 extends through a wall 48 of the valve hall 24. In the embodiment shown, the DC terminals 32,34 and the reactors 46 are located outside the valve hall 24. The reactors 46 may be located inside a separate reactor hall. Alternatively, the reactors 46 may be located inside the valve hall 24, in which case the DC bushings are not essential.

In use, the first and second DC terminals 32,34 of the voltage sourced converter 22 are electrically connected to a DC network 50.

Figure 3:
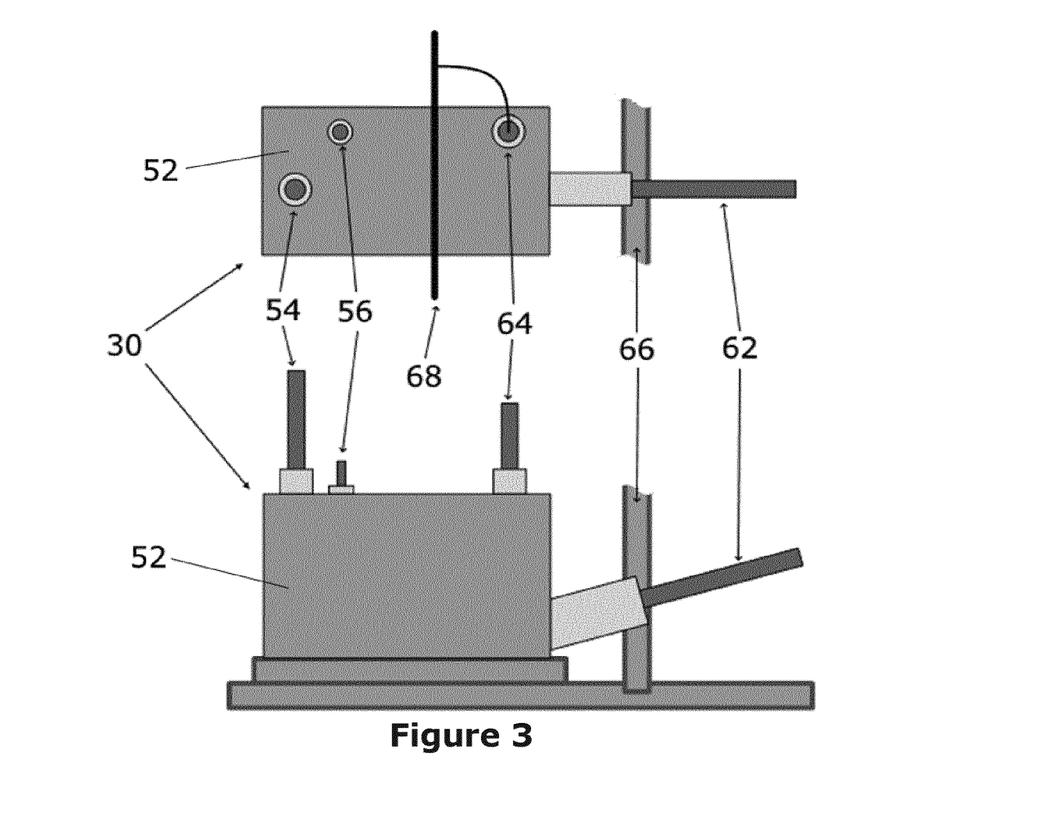
FIG. 3 shows a single-phase transformer of the assembly of FIG. 1.

FIG. 3 shows the structure of a single-phase transformer 30. The three single-phase transformers 30 define a three-phase transformer arrangement. Each transformer 30 includes mutually coupled first and second transformer windings (not shown). In other embodiments, each transformer 30 may have more than two mutually coupled transformer windings. The windings of each transformer 30 is housed within a respective tank 52 that is located outside the valve hall 24.

Each transformer 30 includes line side phase and neutral bushings 54,56 electrically connected to respective terminals of the corresponding first transformer winding. In use, each first transformer winding is electrically connected to a respective phase of a three-phase AC network 58 via the corresponding line side phase bushing 54, and the line side neutral bushings 56 are electrically coupled in a star arrangement with a neutral point 60 connected to ground.

Each transformer 30 further includes valve side phase and neutral bushings 62,64 electrically connected to respective terminals of the corresponding second transformer winding. Each valve side phase bushing 62 extends through a wall 66 of the valve hall 24 so that each valve side phase bushing 62 is electrically connected to a respective one of the AC terminals 36 of the voltage sourced converter 22. In this way, the AC side of the voltage sourced converter 22 is electrically connected to the AC network 58 via the transformers 30.

Each valve side neutral bushing 64 is electrically connected to a respective neutral busbar 68. Each valve side neutral bushing 64 is located outside the valve hall 24.

Figure 4:
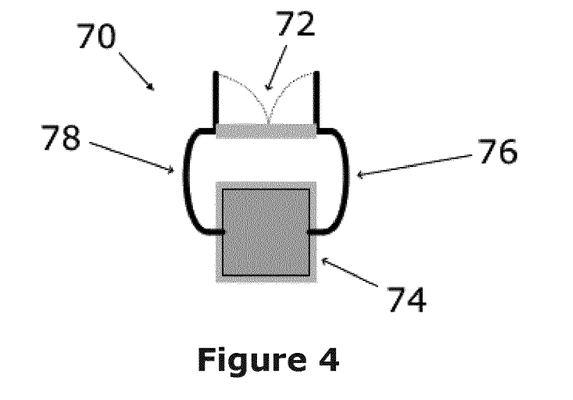
FIG. 4 shows a charging sub-circuit of the assembly of FIG. 1.

The charging circuit 26 includes three charging sub-circuits 70. As shown in FIG. 4, each charging sub-circuit 70 includes a bypass disconnector 72 electrically connected in parallel with a pre-insertion resistor 74 between first and second terminals 76,78. In use, each bypass disconnector 72 is switchable to selectively permit electrical bypass of the corresponding pre-insertion resistor 74. The first terminal 76 of each charging sub-circuit 70 is electrically connected to a respective one of the neutral busbars 68. The second terminals 78 of the charging sub-circuits 70 are electrically interconnected to form a star arrangement with a neutral point 80. In this way, each charging sub-circuit 70 is electrically connected in series between the neutral point 80 and a respective one of the valve side neutral bushings 64.

Figure 5:
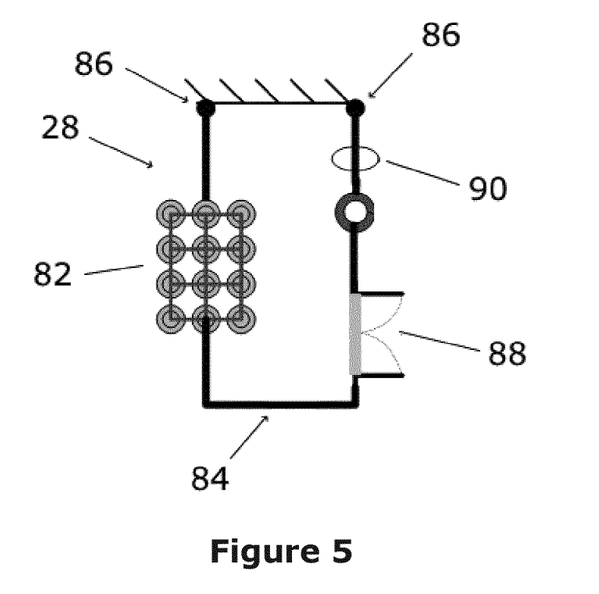
FIG. 5 shows a grounding circuit of the assembly of FIG. 1.

The grounding circuit 28 includes a grounding switching element electrically connected in parallel with a surge arrester 82 between first and second terminals 84,86. As shown in FIG. 5, the grounding switching element includes a grounding disconnector 88 electrically connected in series with a current transducer 90. In use, the grounding disconnector 88 is switchable to selectively permit electrical bypass of the surge arrester 82. In other configurations, the grounding circuit 28 may additionally or alternatively include an inductive device, a resistor, a capacitor, a switchgear and/or any other component suitable for providing a grounding function. In such alternative configurations of the grounding circuit 28, the inductive device may be connected in series with the resistor or may be connected in parallel with the capacitor.

The first terminal 84 of the grounding circuit 28 is electrically connected to the neutral point 80 of the star arrangement comprising the valve side neutral bushings 64, the neutral busbars 68 and the charging sub-circuits 70. Hence, the first terminal 84 of the grounding circuit 28 is electrically connected to the second terminal 78 of each charging sub-circuit 70. In use, the second terminal 86 of the grounding circuit 28 is electrically connected to ground.

The charging circuit 26 and the grounding circuit 28 are located outside the valve hall 24.

The line side phase and neutral bushings 54,56 are arranged so that a longitudinal axis extending through terminals of each of the line side bushings 54,56 has a vertical or substantially vertical orientation. The valve side neutral bushings 64 are arranged so that a longitudinal axis extending through terminals of each of the valve side neutral bushings 64 has a vertical or substantially vertical orientation. The valve side phase bushings 62 are arranged so that a longitudinal axis extending through terminals of each of the valve side phase bushings 62 has a tilted orientation with respect to the horizontal.

The orientations of the valve side phase and neutral bushings 62,64 readily enable the extension of the phase bushings 62,64 into the valve hall 24 and enables the formation of the star arrangement outside the valve hall 24 for easy connection to the grounding circuit 28, while providing a larger clearance between the valve side bushings 62,64 when compared to two horizontal bushings positioned next to each other and extending into the valve hall 24. This not only permits the valve side bushings 62,64 to be designed to use smaller turrets, less material and/or less oil but also permits easy construction of the building's interface with the transformers because only a single hole per transformer 30 in the wall of the building 24 is required to provide access to the phase bushing 62, which in turn simplifies maintenance and replacement of the transformers 30.

The arrangement of the assembly 20 of FIG. 1 provide reductions in overall cost, size and footprint of the valve hall 24 while ensuring that desired operation performance requirements are met.

The location of the valve side neutral bushings 64, the charging circuit 26 and the grounding circuit 28 outside the valve hall 24 provides at least the following benefits:

Grounding equipment located outside the valve hall 24 can be oil-filled.

Reduced cost of the charging circuit 26.

Reduced valve hall size reduces HVAC losses and maintenance and installations costs.

Low electrical noise, e.g. radio-frequency interference (RFI) and television interference (TVI).

Simpler maintenance of the transformers 30, the charging circuit 26 and the grounding circuit 28.

Easier to make the necessary connections to a hot stand-by transformer.

Figure 8:
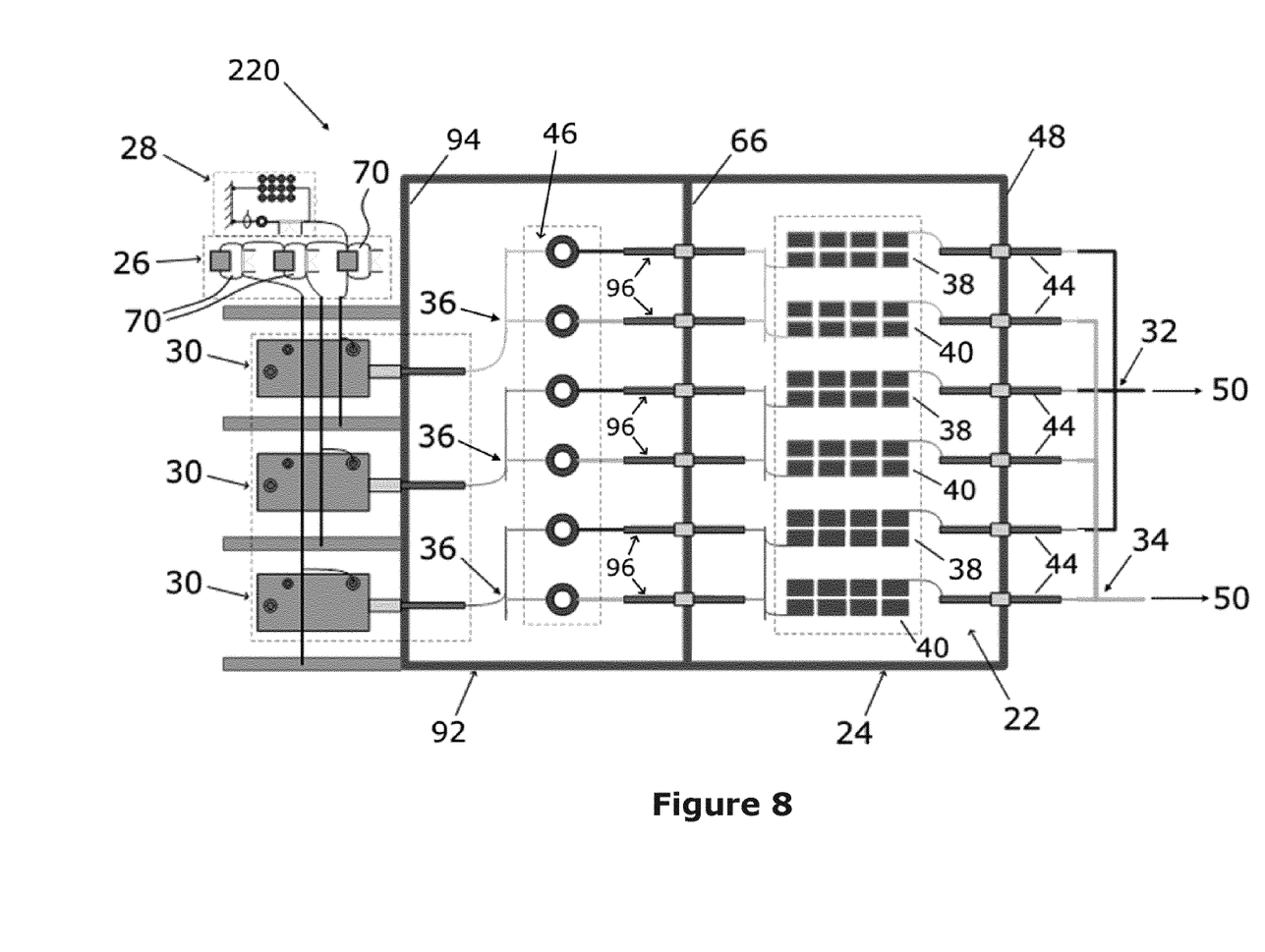
FIG. 8 shows an assembly according to a third embodiment of the invention.
Figure 9:
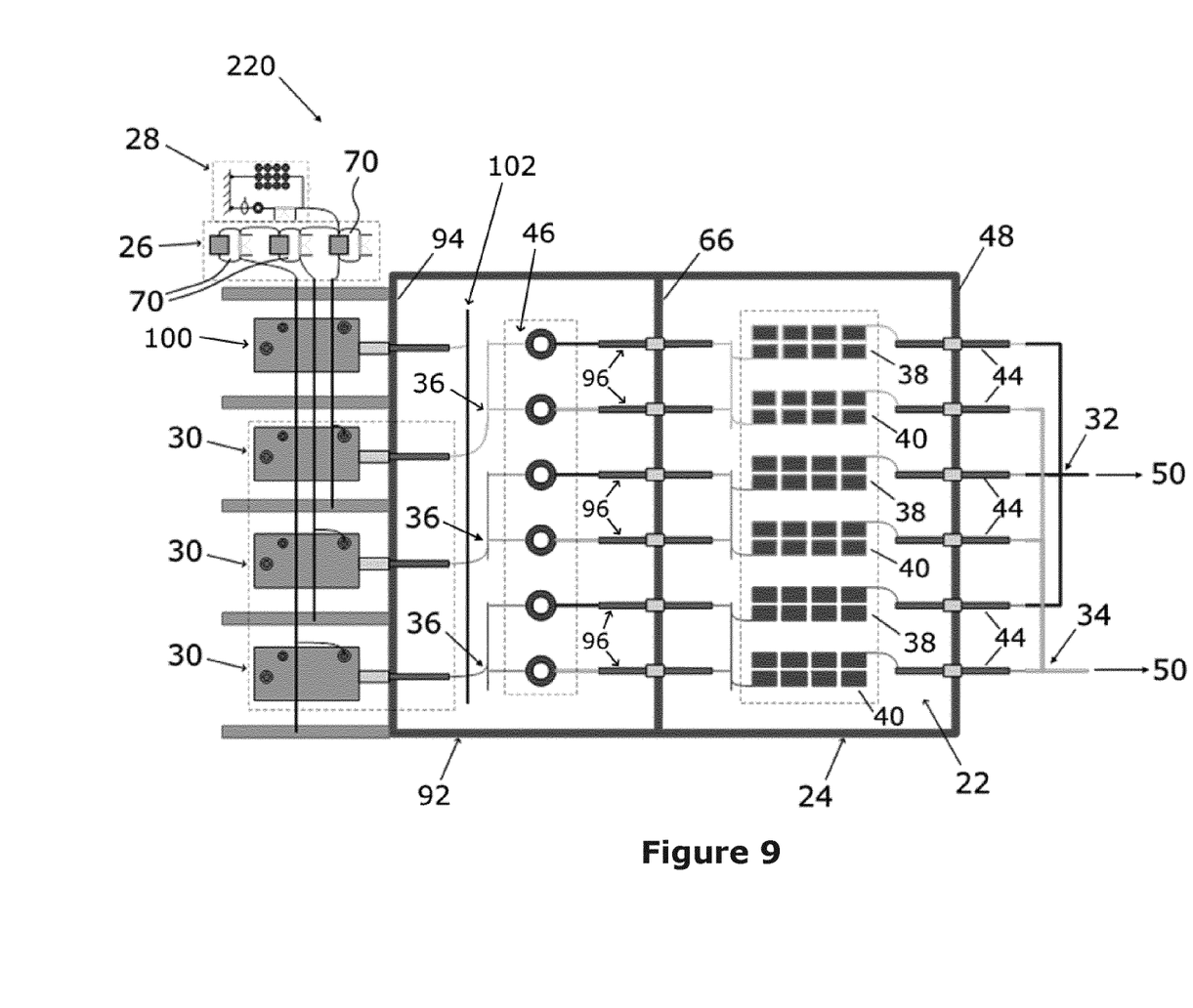
FIG. 9 shows the assembly of FIG. 8 with a hot stand-by transformer.

FIG. 9 shows the addition of a hot stand-by transformer 100 to the third embodiment of FIG. 8. A transfer bus 102 is available to enable replacement of a failed transformer 30 with the hot stand-by transformer 100. It will be understood that the hot stand-by transformer 100 may be applied to other embodiments of the invention.

In addition, the arrangement of the assembly 20 of FIG. 1 reduces the number of bushings 62 that extend inside the valve hall 24, which permits a simpler design of the transformers 30 to provide at least the following benefits:

Less tank stiffening structures, such as stiffening ribs, as it becomes easier to meet seismic requirements.

Faster manufacture of the transformers 30 in a factory and faster installation of the transformers 30 on-site.

Potential for smaller and cheaper bushings due to improved clearance with respect of the wall 66 of the valve hall 24 and due to improved clearance between valve side bushings 62,64.

Figure 6:
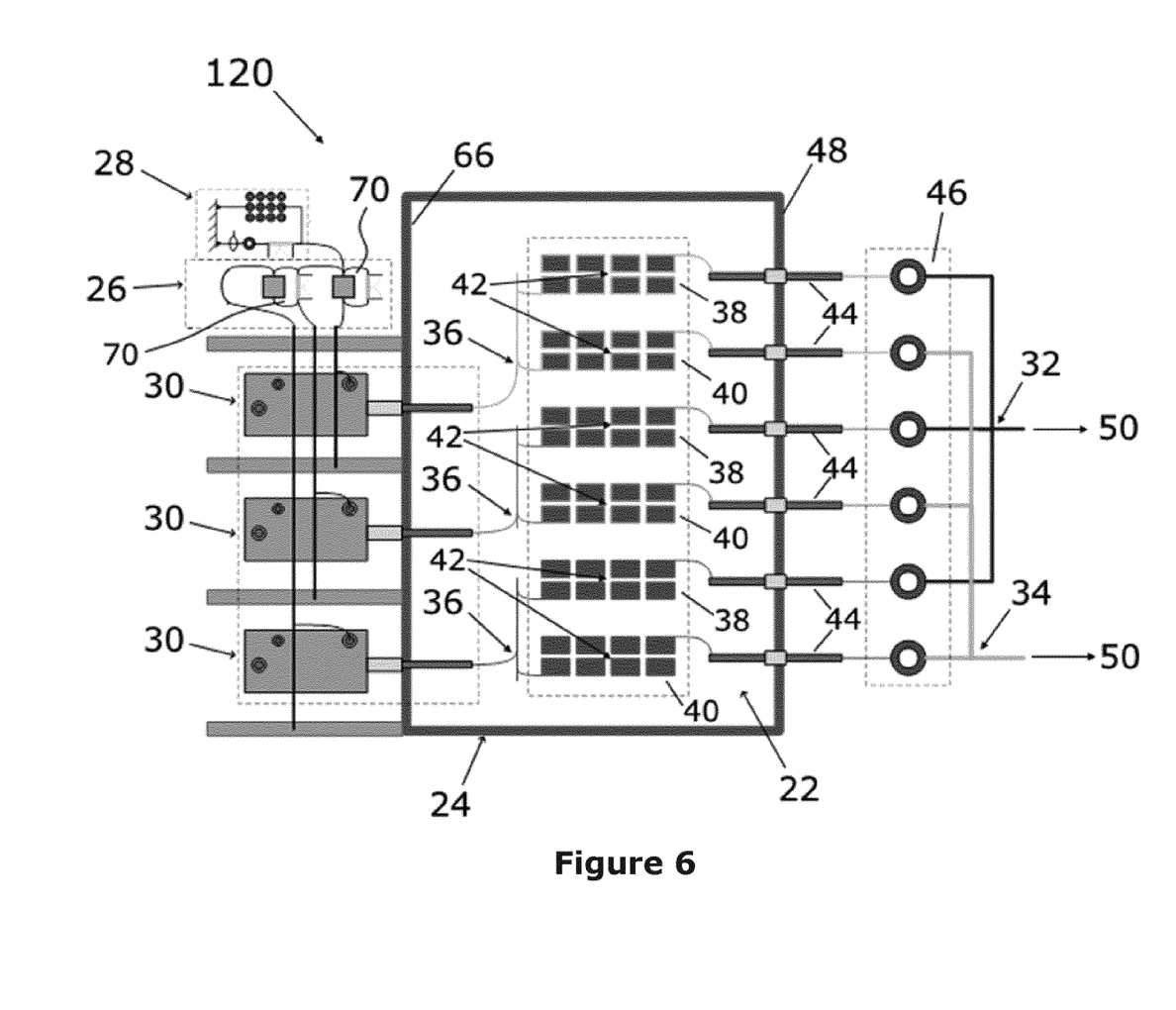
FIG. 6 shows an assembly according to a second embodiment of the invention.
Figure 7:
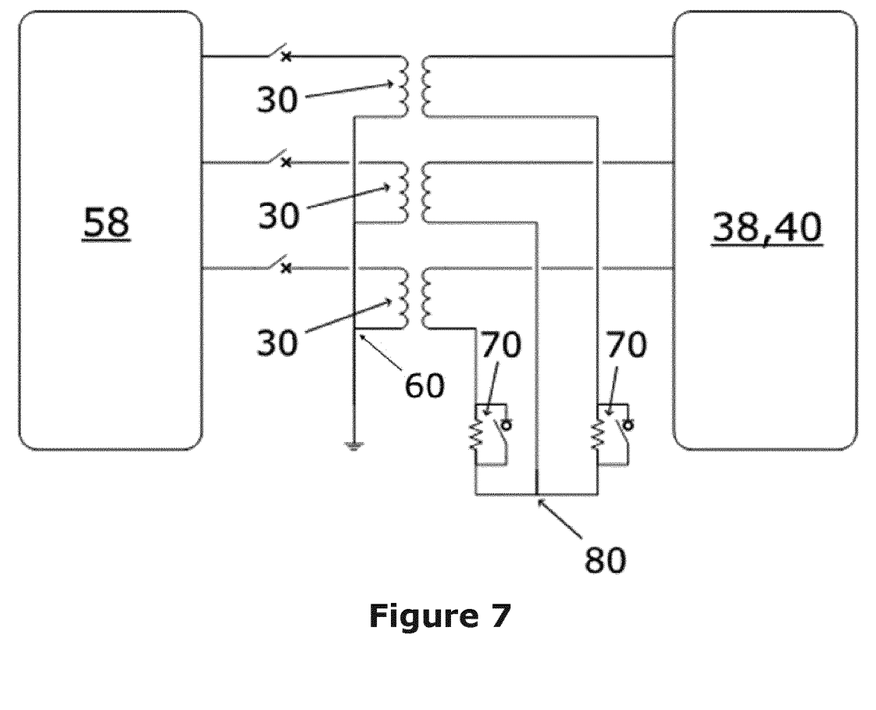
FIG. 7 shows a circuit diagram of the assembly of FIG. 6.

An assembly according to a second embodiment of the invention is shown in FIG. 6 and is designated generally by the reference numeral 120. FIG. 7 shows a circuit diagram of the assembly of FIG. 6. The assembly 120 of FIG. 6 is similar in structure and operation to the assembly 20 of FIG. 1, and like features share the same reference numerals.

The assembly 120 of FIG. 6 differs from the assembly 20 of FIG. 1 in that, in the assembly 120 of FIG. 6:

the charging circuit 26 includes two charging sub-circuits 70;

a first of the charging sub-circuits 70 is connected in series between the neutral point 80 and a first of the valve side neutral bushings 64;

a second of the charging sub-circuits 70 is connected in series between the neutral point 80 and a second of the valve side neutral bushings 64; and a third of the neutral bushings 64 is connected directly to the neutral point 80.

In this manner charging sub-circuits 70 are provided for only two phases of the transformer arrangement, which permits reductions in the size and footprint of the charging circuit 26 while retaining the overall ability to limit any inrush current arising from energisation of the voltage sourced converter 22.

An assembly according to a third embodiment of the invention is shown in FIG. 8 and is designated generally by the reference numeral 220. The assembly 220 of FIG. 8 is similar in structure and operation to the assembly 20 of FIG. 1, and like features share the same reference numerals.

The assembly 220 of FIG. 8 differs from the assembly 20 of FIG. 1 in that, in the assembly 220 of FIG. 8, the reactors 46 are electrically connected to the AC side of the voltage sourced converter 22, instead of the DC side of the voltage sourced converter 22.

In the embodiment shown, the reactors 46 are housed in a separate reactor hall 92 located between the transformers 30 and the valve hall 24.

Each valve side phase bushing 62 extends through a wall 94 of the reactor hall 92 before being electrically connected to a respective one of the AC terminals 36. Each AC terminal 36 is connected to a respective two of the reactors 46. Each reactor 46 is then electrically connected to a respective AC bushing 96, which extends through the wall 66 of the valve hall 24 before being electrically connected to a respective limb portion 38,40.

Alternatively the reactors 46 may be located in the valve hall 24, instead of the separate reactor hall 92, in which case the AC bushings 96 can be omitted.

It will be further appreciated that the topologies of the assemblies in the figures are merely chosen to help illustrate the working of the invention and may be replaced by other suitable assembly topologies.

The listing or discussion of an apparently prior-published document or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

We claim:

1. An assembly for use in electrical power transmission, the assembly comprising:

a building for housing an electrical power transmission component;

a charging circuit;

a grounding circuit for electrical connection to ground; and at least one transformer located outside the building, the or each transformer including mutually coupled first and second transformer windings, the or each first transformer winding for electrical connection to an AC network, the or each second transformer winding for electrical connection to the electrical power transmission component, the or each transformer further including phase and neutral bushings electrically connected to respective terminals of the corresponding second transformer winding, the or each phase bushing extending into the building for electrical connection to the electrical power transmission component, the charging circuit electrically interconnecting the or each neutral bushing and the grounding circuit.

2. The assembly according to claim 1, wherein the or each neutral bushing, the charging circuit and the grounding circuit are located outside the building.

3. The assembly according to claim 1, including three single-phase transformers located outside the building, the three single-phase transformers defining a three-phase transformer arrangement, wherein the neutral bushings of the three single-phase transformers are electrically coupled in a star arrangement so that the charging circuit is electrically connected between each neutral bushing and a neutral point of the star arrangement, the neutral point being electrically connected to the grounding circuit.

4. The assembly according to claim 3, wherein the charging circuit includes three charging sub-circuits, each charging sub-circuit including a bypass switching element and a resistive element, each bypass switching element switchable to selectively permit electrical bypass of the corresponding resistive element, each charging sub-circuit electrically connected in series between the neutral point and a respective one of the neutral bushings.

5. The assembly according to claim 3, wherein the charging circuit includes two charging sub-circuits, each charging sub-circuit including a bypass switching element and a resistive element, each bypass switching element switchable to selectively permit electrical bypass of the corresponding resistive element, a first of the charging sub-circuits electrically connected in series between the neutral point and a first of the neutral bushings, a second of the charging sub-circuits electrically connected in series between the neutral point and a second of the neutral bushings, a third of the neutral bushings electrically connected directly to the neutral point.

6. The assembly according to claim 1, wherein the or each neutral bushing is arranged so that a longitudinal axis extending through terminals of the or each neutral bushing has a vertical orientation.

7. The assembly according to claim 1, wherein the or each phase bushing is arranged so that a longitudinal axis extending through terminals of the or each phase bushing has a horizontal orientation.

8. The assembly according to claim 1, wherein the or each phase bushing is arranged so that a longitudinal axis extending through terminals of the or each phase bushing has a tilted orientation with respect to the horizontal.

9. The assembly according to claim 1, wherein the or each transformer includes a neutral busbar electrically interconnecting the corresponding neutral bushing and the charging circuit.

10. The assembly according to claim 1, wherein the electrical power transmission component is or includes a converter-based electrical device.

11. The assembly according to claim 10, wherein the converter-based electrical device is or includes at least one switching valve of a voltage sourced converter.

12. The assembly according to claim 1, wherein the electrical power transmission component is or includes a reactor.

13. The assembly according to claim 1, wherein the building is a valve hall.

14. The assembly according to claim 12, wherein the building is a reactor hall.

\* \* \* \* \*